United States Patent [19]
Defrancq

[11] Patent Number: 5,810,096
[45] Date of Patent: Sep. 22, 1998

[54] DEVICE FOR CONTROLLING A TRACTOR-PUSHED AGRICULTURAL IMPLEMENT

[76] Inventor: Hubert Defrancq, 2, rue de Laon, F-02190 Guignicourt, France

[21] Appl. No.: 776,122

[22] PCT Filed: Jul. 25, 1995

[86] PCT No.: PCT/FR95/00996

§ 371 Date: Jan. 21, 1997

§ 102(e) Date: Jan. 21, 1997

[87] PCT Pub. No.: WO96/03024

PCT Pub. Date: Feb. 8, 1996

[30] Foreign Application Priority Data

Jul. 27, 1994 [FR] France .................................... 94 09299

[51] Int. Cl.⁶ .................................................. A01B 63/108
[52] U.S. Cl. .................................................. 172/2; 701/50
[58] Field of Search .......................... 364/424.07; 172/2, 172/4, 4.5; 701/50

[56] References Cited

U.S. PATENT DOCUMENTS

| | | | |
|---|---|---|---|
| 3,913,680 | 10/1975 | Carlson | 172/2 |
| 4,282,933 | 8/1981 | Suganami et al. | 172/4.5 |
| 4,437,295 | 3/1984 | Rock | 172/4 |
| 4,878,543 | 11/1989 | Kauss | 172/2 |
| 5,092,409 | 3/1992 | Defrancq | |

FOREIGN PATENT DOCUMENTS

| | | |
|---|---|---|
| 241 747 | 10/1987 | European Pat. Off. |
| 2 649 580 | 1/1991 | France |
| 2 649 810 | 1/1991 | France |
| 34 38 353 | 4/1986 | Germany |

Primary Examiner—Michael J. Carone
Assistant Examiner—Christopher J. Novosad
Attorney, Agent, or Firm—Cushman Darby & Cushman Intellectual Property Group of Pillsbury Madison & Sutro LLP

[57] ABSTRACT

A device for controlling a pushable implement provided with at least one gauge wheel. The device includes a hitch system comprising two lower longitudinal arms (5, 6) with a tool-engaging member (9) at the front ends thereof, an upper engagement assembly (C) joining a third point of engagement (17) to the implement (3), at least one lifting jack (12, 13), and a distribution unit (21) for controlling the raising and lowering of the longitudinal arms (5, 6). A controller (28) operates the distribution unit in response to a degree of slippage measured by a unit (M). The upper engagement assembly (C) includes at least one third-point jack (18; 18a, 18b) connected to a second fluid distribution unit (30, 30') controlled by said controller (28) so that when the longitudinal arms (5, 6) are raised, the second distribution unit (30, 30') switches to a position in which part of the load is shifted onto the tractor as the lower longitudinal arms are raised.

12 Claims, 3 Drawing Sheets

DEVICE FOR CONTROLLING A TRACTOR-PUSHED AGRICULTURAL IMPLEMENT

This application is the national phase of international application PCT/FR95/00996, filed Jul. 25, 1995 which designated the U.S.

The invention relates to a device for controlling an agricultural implement equipped with at least one gage wheel and intended to be pushed by a tractor, the device being of the sort comprising a hitch and lift system intended to be mounted at the front of the tractor in order to fasten the implement, this system including:

two lower longitudinal arms, the rear parts of which include means of articulation to the structural part of the tractor, and the front ends of which are equipped with a means of attaching the implement in order to constitute two bottom attachment points, an upper attachment member for linking a third attachment point of the tractor to the implement, the latter being equipped, at its rear part, with three attachment means which are the conjugate of those of the hitch system, at least one lifting ram and distribution means for controlling the raising or lowering of the longitudinal arms;

and a controller which commands these distribution means in response to information regarding the slippage of the tractor originating from slippage-measuring means provided on the tractor, the assembly being arranged so as to command a raising of the lower arms and a reduction in the working depth of the implement when the amount of slippage of the tractor becomes greater than a given reference value.

A device of this sort is known from FR-A-2,649,810 and plays a part in improving the working conditions of the tractor. However, although the reduction in depth by reducing the effort required is accompanied by a reduction in slippage, there is no improvement in the traction. One of the objects of the invention is for the reduction in working depth of the implement to be accompanied by a transfer to the tractor of the load normally supported by the gage wheels of the implement.

Another cause of loss of traction is explained hereafter.

Pushed implements which work in the ground are equipped with gage wheels especially to allow them to follow the lie of the land in all conditions.

In order to avoid mechanical stresses which are detrimental to the operation of the tractor/implement combination, it is appropriate, when working the ground, for the hydraulic hitch and lift system to act in a floating mode so as to allow the longitudinal and possibly transverse lie of the land to be followed, or for the front lift to be equipped with means allowing the implement to pivot longitudinally (pivoting about an axis substantially parallel to the axes of the wheels of the tractor) and possibly laterally (pivoting about an axis parallel to the longitudinal axis of the tractor), with respect to the lift system.

Using the hydraulic lift system in floating mode does not allow the implement to be supported during work, and this implement is therefore supported essentially by the gage wheel or wheels. This results in a loss of traction at the tractor and in difficulty in driving the latter. The implement is tricky to adjust.

The use of an upper attachment member formed by a sliding link system, combined with holding the lower arms in position, makes it possible to bear some of the weight of the implement and simplify adjustment. However, a substantial amount of the weight of the implement is still supported by the gage wheels. Here too this results in a loss of traction at the tractor.

In order to improve the traction of tractors, there is known, from FR-A-2,512,319, a device in which the upper attachment member comprises at least one ram, while a system of load sensors is provided on the gage wheel or wheels so as, by means of an electro-hydraulic unit, to command feed to the top link ram in order to remove some of the weight borne by the gage wheels and transfer it to the tractor to improve its traction.

A significant drawback in such a device is that it requires gage wheels equipped with sensors for each implement. This results in an appreciable purchase on-cost, and an additional maintenance burden because the sensors, which are highly stressed, are situated in regions which are exposed to attack. In addition, it is necessary to provide on the implement passage for the bundles of electrical cables which are intended to connect the sensors to the electro-hydraulic unit, and for these bundles to be connected up to the tractor. These operations may be the source of errors and may lengthen the time taken to couple the implement to the tractor. Furthermore, the connections may be the sources of breakdowns.

Another object of the invention is to improve the traction of the tractor without having to use sensors on the gage wheels, or bundles of electric cables providing connection between these sensors and the tractor.

Furthermore, it is desirable for the control device, while optimally transferring load to improve the traction of the tractor automatically, and without resorting to sensors on gage wheels, to allow the longitudinal and possibly the transverse lie of the land to be followed.

According to the invention, a device for controlling an agricultural implement equipped with at least one gage wheel and intended to be pushed by a tractor, of the sort defined previously, is characterized in that, in a way known per se, the upper attachment member comprises at least one third point ram, connected to second fluid-distribution means capable of adopting a first position in which the variations in length of the assembly of the rod and of the cylinder of the third point ram are free, and a second position for which the third point ram plays a part in transferring load from the gage wheel to the tractor, and in that these second distribution means are operated by the abovementioned controller in such a way that when raising of the longitudinal lower arms takes place, the second distribution means switch into their second position in order to transfer some of the load on the gage wheel or wheels of the implement toward the tractor at the same time as a command to reduce the working depth of the implement.

The geometric configuration of the hitch system is preferably such that, as required in the standards, when raising of the lower arms is commanded, the third point ram is made to extend; advantageously, according to the invention, the second distribution means, in their second position, block the liquid in that chamber of the ram which is compressed upon lengthening and therefore block the overall length of the third point ram in such a way that the raising of the lower arms is then accompanied by a lifting-up of the front part of the implement and a lightening of the gage wheel or wheels with automatic load transfer to the tractor.

Advantageously, the third point ram is of the double-acting type and each of the chambers situated on either side of the piston is connected to the second fluid-distribution means.

As a preference, the second distribution means are operated electrically and the layout is designed so that when the control device is electrically powered, the distribution means switch into their first position corresponding to a floating mode, whereas in the event of the electrical supply being cut off, the second distribution means switch into the second position, blocking the length of the third point ram.

Advantageously, the second distribution means, in their first position, are capable of forcing liquid under a relatively low pressure, particularly one lower than 20 bar, into the rod-side chamber of the ram, in order to avoid the phenomenon of cavitation, while the other chamber is connected to tank (reservoir of liquid at atmospheric pressure).

In cases where just one third point ram is provided, for example in cases where the implement is equipped with just one gage wheel, the second distribution means operating this third point ram advantageously include a third position which allows the distribution of the fluid to be reversed by comparison with the first position and a lengthening of the ram to be commanded, the switching of the second distribution means into this third position being commanded with the aid of an external contact button, particularly during implement-attachment operations.

An intermediate frame, especially one in the shape of an inverted U, as shown in FR-A-2,649,580 may be provided between the points of attachment of the hitch system and the implement. In this event, the control device includes two third point rams forming between them an angle the vertex of which corresponds to the third point of attachment to the structural part of the tractor, and the ends of which correspond to two lateral attachment points provided on the upper part of the frame, symmetrically with respect to the third point of attachment of the implement, situated in the middle of the upper part of the frame.

The second distribution means, for a system with two double-acting third point rams, are arranged so that in their first position they form a bridge placing the two ram-side chambers of the two third point rams in communication, while the two other chambers of the rams are connected to tank.

Advantageously, the two lower longitudinal arms of the hitch system are capable of relative motion one with respect to the other and may adopt different inclinations one with respect to the other.

When the hitch system comprises an intermediate frame, the control device preferably comprises third two-position distribution means arranged on a pipe connected in parallel to the two third point ram chambers opposite the rod; these third distribution means in a first position (normal operation) link the chambers opposite the rod to the low-pressure liquid reservoir, while in a second position, commanded from the outside, these third distribution means ensure that a liquid under the same pressure as the liquid let into the rod-side chambers is let into the chambers opposite the rod so that through a differential effect which is due to the cross-sectional area of the rod, there is a lengthening of the third point rams, especially with a view to making it easier to attach the third top point of the implement after the two lower points have been attached.

The intermediate frame may include, at the top in the middle, two rearwardly projecting flanges equipped, at their rear end, with a hole or the like for attaching a third point bar, particularly an adjustable-length bar.

The points of attachment of the hitch system, particularly the third point bar, are arranged to allow automatic coupling, means indicating locking advantageously being provided.

The invention consists in a certain number of other arrangements apart from the arrangements revealed hereinabove, and these will be dealt with more fully hereafter with regard to embodiments described with reference to the drawings appended hereto, but which are not in any way limiting.

FIG. 1 of these drawings is a diagrammatic view in perspective of an agricultural implement hitched to the front of a tractor.

Figure 9:
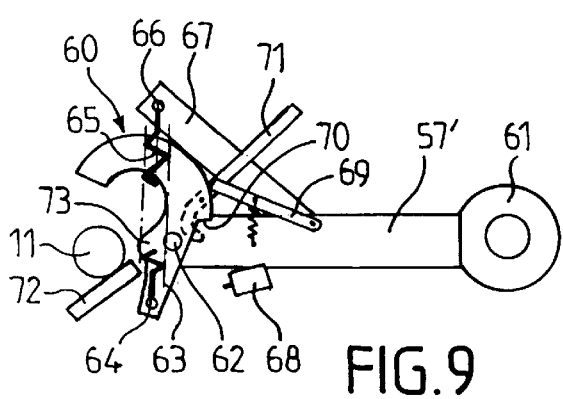
Figure 10:
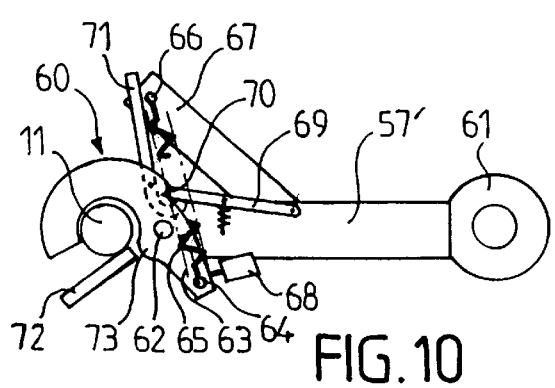

Finally, FIGS. 9 and 10 diagrammatically illustrate an automatic coupling top bar.

Figure 1:
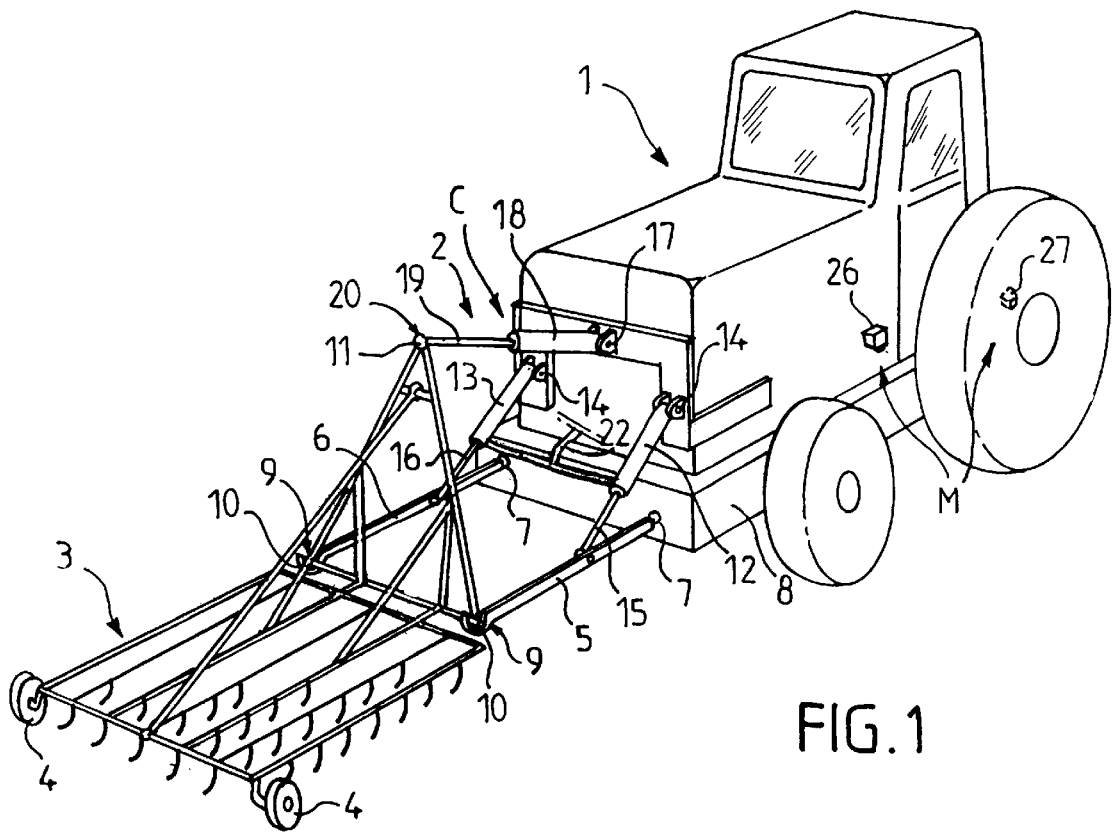
Figure 3:
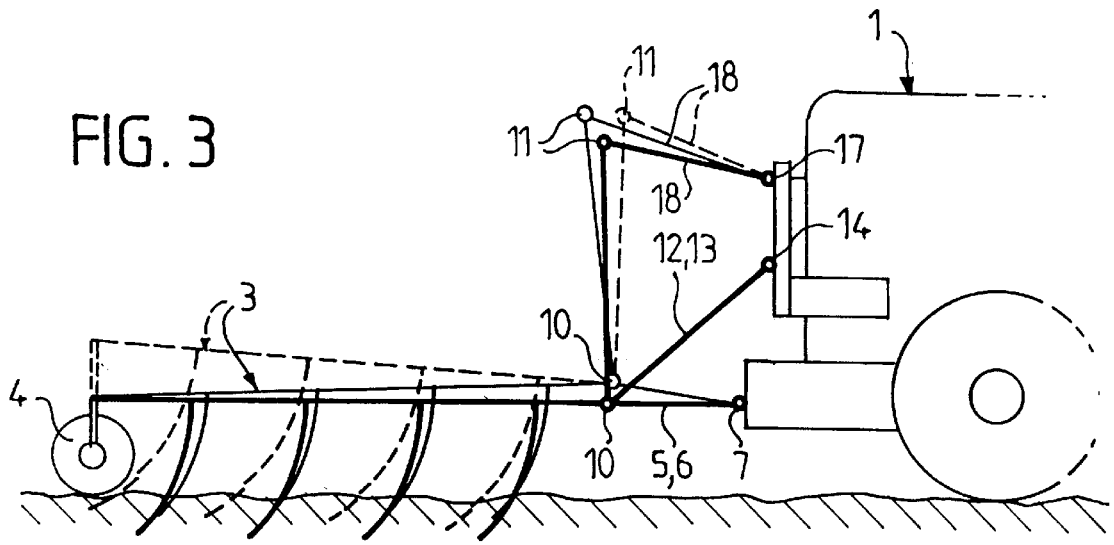
FIG. 3 is a diagrammatic elevation view illustrating the operation of the device according to the invention.

Referring to the drawings, especially to FIGS. 1 and 3, it is possible to see a tractor 1 equipped at the front with a hitch and lift system 2 to which is attached an implement 3 intended to be pushed by the tractor 1. The implement 3 represented diagrammatically in FIG. 1 is a wide implement, for example of the wide chisel plow type and includes, on each side, at its front end, a gage wheel 4. In the case of a narrower implement, for example in the case of a plow, just one gage wheel will be provided at the front of the implement. Of course, the tractor 1 is generally equipped at the rear with one or more other implements which have not been represented in the drawings.

The hitch and lift system 2 includes two lower longitudinal arms 5, 6, the rear parts of which include means 7 of articulation to the structural part 8 of the tractor and the front ends of which are equipped with conventional attachment means 9, such as an attachment bracket. These two attachment means 9 constitute two bottom attachment points for the implement 3 which is equipped in the conventional way at its rear end with three attachment points, namely two lateral bottom points 10 and a middle top attachment point 11.

A lift ram 12, 13 is associated with each arm 5, 6 to control the raising or the lowering of this arm. That end of the cylinder of each ram 12, 13 which is furthest from the piston rod is articulated to a transverse spindle 14 borne by the tractor 1. The rod 15, 16 of the piston of each of the rams is connected by a transverse articulation to the associated longitudinal arm 5, 6. As an alternative, each ram could be reversed and fulfil the same functions.

In the example under consideration, the arms 5 and 6 are capable of a relative motion one with respect to the other, giving rise to pivoting about an imaginary longitudinal axis without a change in height. In an alternative form, the arms 5 and 6 could be connected together rigidly, in which case just one lift ram could be provided.

The hitch system 2 comprises an upper attachment member C connected to a third point 17 of attachment of the tractor situated above and equidistant from the two bottom attachment points 7. The top attachment member C consists, in the embodiment of FIG. 1, of a third point ram 18. That end of the cylinder of the ram 18 which is furthest from the piston rod 19 is connected by an articulation to the attachment point 17 of the tractor. The piston rod 19 at its outer end carries a means 20 of attachment for the conjugate top attachment point 11 of the implement.

Distribution means, preferably consisting of an electro-distributor 21 (FIG. 2) are provided for controlling the inlet or discharge of liquid under pressure into or out of the rams 12, 13 and thus controlling the raising or the lowering of the longitudinal arms 5, 6.

The rams 12, 13 are single-acting, but could be double-acting. The lower chambers of the cylinders, these chambers being situated on the rod side, are connected up in parallel by a liquid pipe 22 to one port of the distributor 21. The pipe 22 which is T-shaped in order to provide parallel feed may comprise flexible portions. The distributor 21, when the slide valve is in the neutral position, isolates the pipe 22 from the pressure source P and from the tank 23 or reservoir of liquid which is not under pressure. The fact that the chambers of the rams 12, 13 are linked in parallel allows liquid to be transferred from one ram to the other and allows the abovementioned symmetric relative motion in opposite directions of the arms 5, 6 one with respect to the other, with the implement 3 pivoting about an imaginary longitudinal axis without change in height.

The distributor 21 includes two electromagnet coils 24, 25. When voltage is applied to the coil 24, the slide valve of the distributor 21 switches into a position (right-hand box) in which the liquid under pressure is sent into the lower chamber of the ram 12 or 13, which causes the rod 15, 16 to retract and the associated arm 5, 6 to be raised. When voltage is applied to the coil 25, the slide valve of the distributor 21 switches into a position (left-hand box) in which the pipe 22 is connected to the tank 23. The liquid can therefore flow out of the lower chamber of the ram 12, 13, which pushes out the rods 15, 16 and causes the arms 5, 6 to be lowered under the effect of the load they are bearing.

Means M are provided for measuring the slippage of the tractor relative to the ground. These means M comprise, for example, a radar 26 fixed to the structural part of the tractor, pointing toward the ground, and capable of providing the actual speed of the tractor 1 relative to the ground as explained in FR-A-2,649,810. A sensor 27 is furthermore associated with a driving wheel of the tractor, to count the number of wheel revolutions per unit time and determine, from the perimeter of the wheel, the theoretical speed that the tractor should have in the absence of slippage. The information provided by the radar 26 and the sensor 27 is sent to inputs of an electronic calculation circuit 28 comprising, for example, a microprocessor, capable of determining the amount of slippage. The electronic calculation unit 28 compares the calculated amount of slippage with a reference value. If the calculated amount of slippage becomes higher than the reference value, then the unit 28 on one of its outputs connected to the coil 24 by an electric connection 29 provides a command voltage to make the slide valve of the distributor 21 switch into the position which allows liquid under pressure to be let into the lower chamber of the rams 12, 13. This results in raising of the arms 5, 6 and in lifting-up of the implement 3. The working depth of this implement 3 reduces, which causes a reduction in the pushing force to be exerted by the tractor 1 and tends to reduce the slippage.

The control device D of the invention comprises (in addition to the hitch system, the distribution means 21 and the controller 28 which commands as a function of the slippage of the tractor) second liquid-distribution means 30. The third point ram 18 is double-acting and its two chambers are connected by respective pipelines 31, 32 to two ports of the second distribution means 30. These means 30 consist of an electro-distributor 33 the slide valve of which is commanded by two electromagnetic coils 34, 35 provided at each end of the distributor. When voltage is applied to neither of the coils 34, 35, the distributor 33 is in its second position, or neutral position, illustrated in FIG. 2, for which the two pipelines 31, 32 are closed. In these conditions, the liquid lying in the two chambers of the ram 18 which are situated on either side of the piston is trapped; the piston of the ram 18 and the rod 19 connected to this piston cannot move because the liquid is confined to a closed volume; the overall length of the ram 18 is blocked at a constant value. The distance between the point 17 of articulation of the tractor and the attachment means 20 which receives the top attachment point of the implement 11 is also constant.

It should be noted that the distance between the articulations 7 and 17 on the tractor side is less than the distance between the articulations 10 and 11 on the implement side, which means that the raising of the arms 5, 6 and of the top attachment point 11 makes the ram 18 extend.

Figure 2:
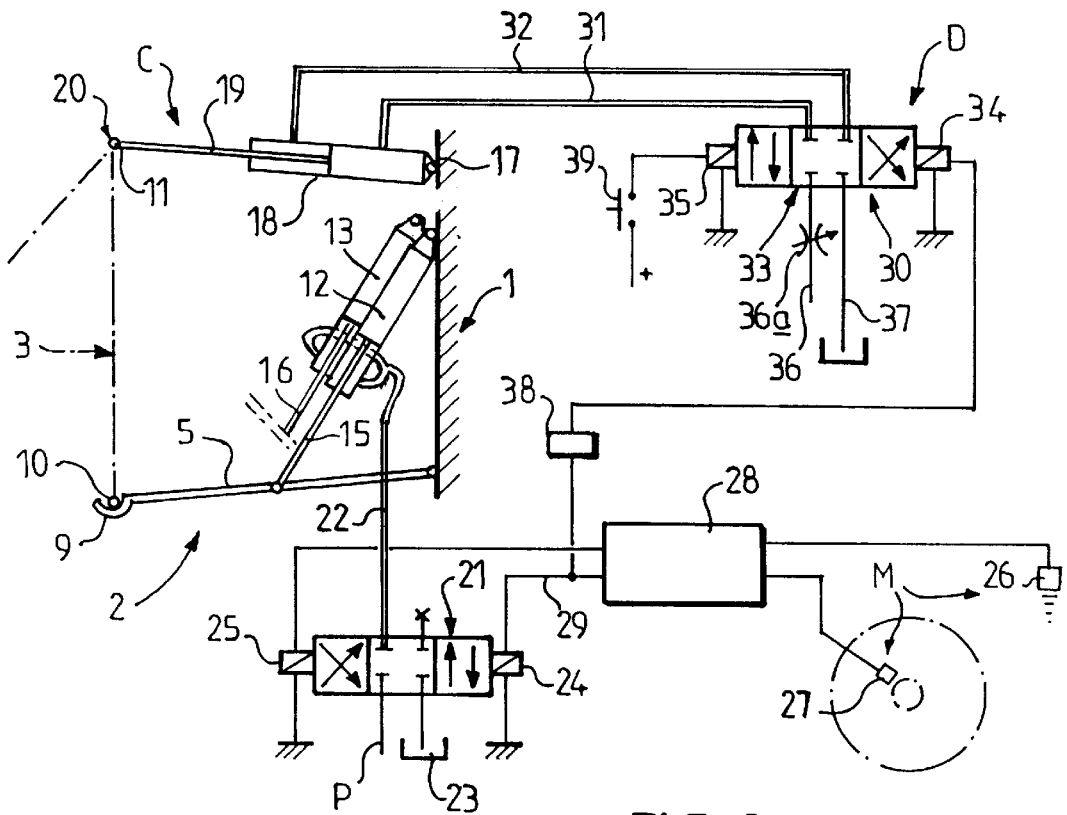
FIG. 2 is a diagram of the control device according to the invention.

When voltage is applied to the coil 34, the slide valve of the distributor 33 moves to the left in FIG. 2, to adopt its first position, which means that the pipeline 32 which opens into that chamber of the ram 18 which is on the rod side, finds itself connected to a pipeline 36 able to supply liquid under a relatively low force-feed pressure coming from an auxiliary source other than the pump supplying the pressure P. An adjustable restriction 36a may be provided on the pipeline 36. With the slide valve in this first position, the pipeline 31 is connected to a pipeline 37 leading to the tank. By way of nonlimiting indication, the force-feed pressure of the liquid in the pipeline 36 does not exceed 20 bar, whereas the pressure P may be as high as about 200 bar.

The liquid under force-feed pressure supplied by the pipeline 36 makes it possible to avoid a phenomenon of cavitation in the rod side chamber of the ram 18, but has no appreciable influence on the motion of the piston when the implement 3 is hitched, because this force-feed pressure is too low by comparison with the pressures developed by the reactions of the implement on the hitch system. The other pipeline 31 is connected to the tank 23 when the coil 34 is energized. It may thus be seen that the motion of the rod 19 of the ram 18 is free, when the coil 34 is energized, because the liquid contained in each of the chambers can be discharged freely in response to the motion of the rod 19 due to the reactions of the implement 3.

The second distribution means 30 are commanded by the controller which consists of the electronic unit 28 combined with the sensor 27 and the radar 26 in such a way that when raising of the longitudinal arms 5, 6 takes place, the distributor 33 switches into the second position (neutral position) represented in FIG. 2, blocking the length of the ram 18.

Advantageously, the output of the electronic unit 28 used to command the coil 24 of the electro-distributor 21 (in order to raise the arms 5, 6) is used to command the other coil 34. An invertor circuit 38 is provided between the output of the circuit 28, which output is connected to the coil 25, and the coil 34; in these conditions, when no command voltage is supplied to the coil 24, the reverse circuit 38 gives on its output a voltage which is applied to the coil 34; the distributor 33 is therefore held in its first position (free variation in length of the ram 18) when there is no command to raise the arms 5, 6.

By contrast, when there is voltage on the coil 24, causing the slide valve 21 to move into the position which raises the arms 5, 6, the voltage on the coil 34 disappears and the slide valve 33 switches into its second position, illustrated in FIG. 2, causing the length of the ram 18 to be blocked.

When voltage is applied to the coil 35, this coil makes the slide valve 33 switch into a third position for which the liquid under force-feed pressure coming from the pipeline 36 passes into the pipeline 31 opening into that chamber of the ram 18 which is opposite the rod 19, whereas the pipeline 32 is connected to tank. Voltage may be applied to the winding 35 using an external command involving a contact 39.

The application of power to the coil 35 is commanded, as explained later, with a view to facilitating the attachment of the implement 3, while the hitch system is not subjected to loadings from the implement 3. The force-feed pressure coming from the pipeline 36 is then sufficient, when let into that chamber of the ram 18 which is opposite the rod 19, to push this rod 19 out and lengthen the ram.

Of course, the electric commands for powering the various coils 24, 25 and 34, 35 are designed to be such that they prevent voltage from being applied to two opposed coils simultaneously.

This being the case, the control device D operates as follows.

Referring to FIG. 3, it is possible to see, in thick solid line, the relative positions of the tractor, of the implement, and of the hitch system (represented diagrammatically) when the amount by which the tractor 1 slips is below a reference value.

As explained earlier, the distributor 33 (FIG. 2) is in its first position, the coil 34 being energized, in which position the variations in length of the third point ram 18 are free. The implement 3 will be able to follow the land, in the longitudinal sense, by rotating about a horizontal transverse geometric axis passing through the bottom attachment points 10 (see FIG. 1).

If the amount of slippage exceeds the reference value, the electronic unit 28 acts on the distributor 21 to command the retraction of the rods 15, 16 of the rams 12 and 13 and the raising of the arms 5, 6.

In the absence of the second distribution means 30 in accordance with the invention, the implement would adopt the position represented in fine solid line in FIG. 3, for which the bottom attachment points 10 are raised while the top attachment point 11 would tilt forward, moving upward, which would cause a lengthening of the ram 18. The load to which the gage wheel 4 is subjected would remain substantially the same as would the load borne by the tractor. There is therefore no improvement in the traction, even if there is a reduction in the slippage combined with the reduction in pushing effort required.

According to the invention, thanks to the combination of all of the control means with the second distribution means 30, when the distributor 21 switches into the position commanding the raising of the arms 5, 6, the second distribution means 30 switch into their second position illustrated in FIG. 2, by cutting off the excitation of the coil 34. The liquid is therefore trapped in the chambers of the ram 18, the length of which is blocked at a constant value. In these conditions, as illustrated in broken line in FIG. 3, when the arms 5 and 6 are raised, the ram 18 pivots about the spindle 17, at constant length, and the front part of the implement 3 is therefore lifted up and the gage wheel or wheels 4 is or are lightened with load being transferred automatically onto the tractor, the traction of which is improved.

The increase in load as the implement 3 is raised may squash the tires of the tractor but does not lead to an increase in the working depth of the implement. The control device acts automatically by continual incrementation in order permanently to match the load transfer to the traction conditions required, and the length of the ram 18 to the implement following the lie of the land.

The control device has the advantage of being completely independent of the implement and of requiring no adjustment, thus avoiding the presence of sensors on the gage wheel and of electric connecting wires.

Figure 4:
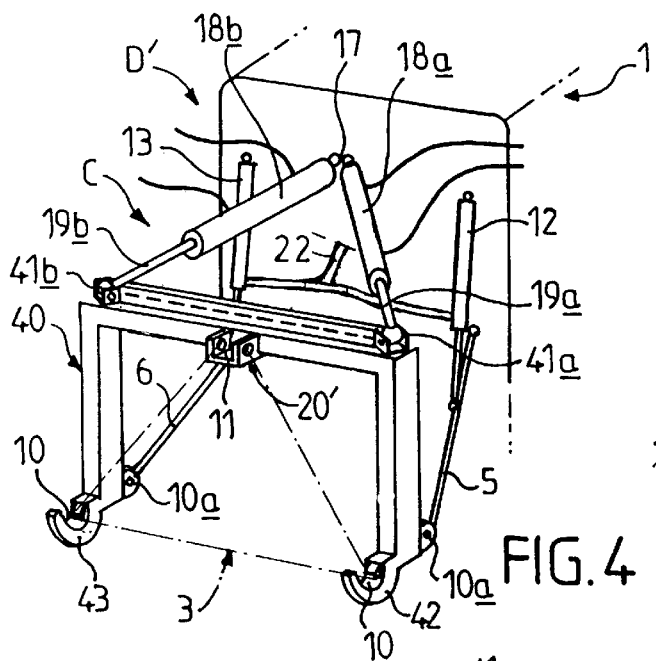
FIG. 4 is a diagrammatic perspective view of a hitch device with the intermediate frame.
Figure 5:
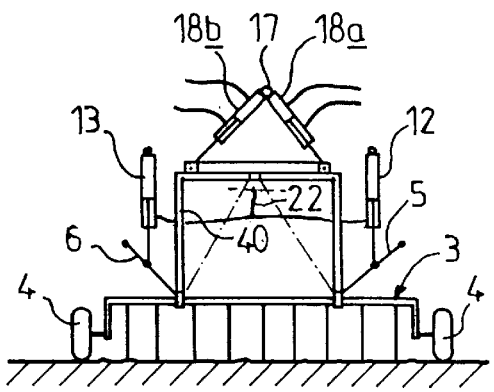
FIG. 5 is a diagrammatic front-on view of the device of FIG. 4 to which an implement is hitched.

Referring to FIG. 4, it is possible to see a hitch system involving an intermediate frame 40 in the shape of an inverted U as shown by FR-A-2,649,580. The frame 40 is arranged between the attachment points of the hitch system and the three attachment points of the implement.

The control device D includes two third point rams 18a, 18b forming between them an angle the vertex of which corresponds to the third point 17 of attachment on the tractor. The rams 18a, 18b are of the double-acting type as is the ram 18. The ends of the rods 19a, 19b correspond to two lateral attachment points 41a, 41b provided on the upper part of the frame 40 symmetrically with respect to the third attachment point 20 situated in the middle of the top of the frame, toward the front. The frame 40 furthermore includes two lateral bottom attachment points 42, 43 (produced in the conventional way using attachment brackets with blocking device) for the bottom attachment points of the implement. At the bottom at the rear and on each side, the frame 40 includes attachment points 10a borne by the ends of the arms 5, 6.

Figure 6:
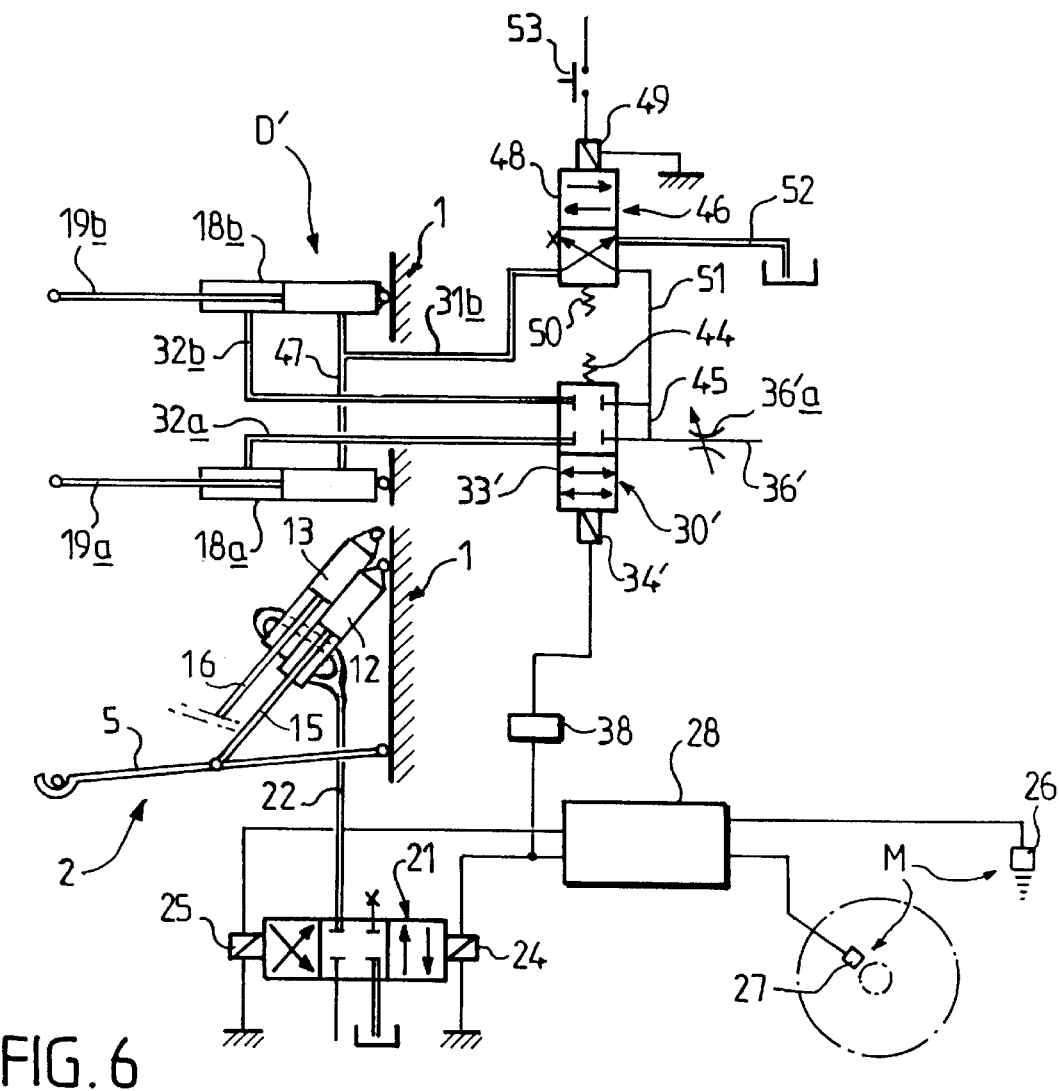
FIG. 6 is a diagram of the control device according to the invention with hitch system according to FIGS. 4 and 5.

As visible in the diagram of FIG. 6, the second distribution means 30' for feeding the two third point rams 18a, 18b, comprise an electro-distributor 33' equipped with an electric command coil 34' and with a return spring 44 for return to the neutral position or second position for which the two pipelines 32a, 32b leading from the chambers on the rod side of the rams 18a, 18b are closed, which corresponds to the length of the rams 19a, 19b being blocked.

The two ports of the distributor 30' which are opposite the ports connected up to the pipelines 32a, 32b are connected to one another by a bridge 45, and are connected by the pipeline 36' to a source of liquid under force-feed pressure, generally below 20 bar. An adjustable restriction 36'a may be provided on the pipeline 36'.

When voltage is applied to the coil 34', the slide valve 33' switches into its first position for which the two pipelines 32a, 32b are connected to the bridge 45 and to the pipeline 36'.

The control device D' furthermore comprises third distribution means 46 arranged on the pipe 31b connected up to that chamber of the ram 18b which is opposite the rod 19b. A pipeline 47 connects up in parallel the two chambers opposite the rods of the rams 18a, 18b; these two chambers are therefore fed in parallel by the pipeline 31b. The third distribution means 46 comprise a slide valve 48 which can adopt two positions under the action of an electric coil 49 and of a spring 50 acting in opposition to the coil, respectively.

The distributor 46 includes two ports on the opposite side to the pipeline 31b, one of the ports being connected by a pipeline 51 to the bridge 45 and therefore to the pipeline 36'. The other port is connected by a pipeline 52 to tank. In a first position, or neutral position, represented in FIG. 6 and corresponding to the coil 49 not being energized, the slide valve 48 establishes a link between the pipeline 31b and the pipeline 52, while the pipeline 51 is closed. In these conditions, when the coil 34' is energized, the lengths of the rams 18a, 18b can vary freely. The motions of extension or of retraction of the rams 18a, 18b are possible as a function of the lie of the land over which the gage wheel or wheels of the implement is/are running. Fluctuations are taken into account by the bridge 45, with a volume of liquid being transferred from one chamber of one ram into the other. The gage wheels 14 [sic] ensure that the implement is stable.

As explained earlier, when the control device commands a raising of the arms 5, 6, the second distribution means, the coil 34' of which is no longer energized, is commanded at the same time. The slide valve 33' switches into the neutral position and closes the rod side chambers of the two rams 18a, 18b, the lengths of which are blocked.

The geometry of the assembly is such that raising the arms 5, 6 (and the implement) leads to a demand to lengthen the rams 18a, 18b; since these rams are blocked, the front part of the implement is lifted up and the gage wheels are lightened with load being transferred to the tractor and the traction being improved (see FIG. 3).

The coil 49 of the third distribution means 46 may be commanded from the outside using a contact 53 which allows this coil to be electrically powered. When a command is given, from the outside, by an operator, to energize the coil 49, the slide valve 48 switches into its second position for which the pipeline 51 finds itself connected to the pipeline 31b and to those chambers of the rams 18a, 18b which are opposite the rods. As long as the rods 19a, 19b do not encounter appreciable resistance, for example if the implement is not attached, then the force-feed pressure supplied by the pipeline 52 will be sufficient to cause the lengthening of the rams 19a, 19b the rod side chambers of which are connected by the pipelines 32a, 32b to the pipeline 36'. Through a differential effect owing to the larger working cross-sectional area of the chambers opposite the rods 19a, 19b, there will indeed be a lengthening of the rams 18a, 18b when the coil 34 is energized.

Figure 7:
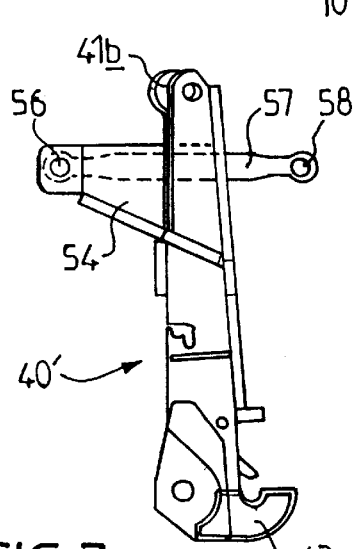
FIG. 7 is a side view of an intermediate frame with a top third point according to the invention.
Figure 8:
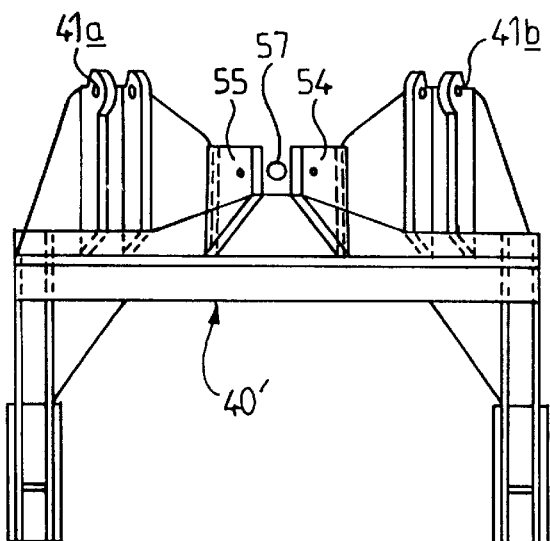
FIG. 8 is a rear view of the frame of FIG. 7.

Referring to FIGS. 7 and 8, it is possible to see an alternative form 40' of the intermediate frame which includes, at the top in the middle, two flanges or cheeks 54, 55 projecting backward (instead of including the top attachment point 20') and delimiting an empty space between them. The flanges 54, 55 are equipped, toward their rear end, with a hole 56 for the passage of an attachment spindle of a third point bar 57, the length of which is preferably adjustable. This bar 57 can therefore pivot, between the flanges 54, 55, about a substantially horizontal axis passing through the holes 56. The front end of the bar 57 is equipped with an attachment means 58 for the top attachment point 11 of the implement. The bar 57 may be held with a possibility to rotate about the axis 56 [sic] by flexible links such as a chain and a spring which are attached at points on the frame 40' which are situated higher up than the axis 56 [sic].

When a voltage is applied to the control device D or D', for example when the electric commands of the device are initialized, as already explained, the second distribution means 30 or 30' adopt the first position for which the rod side chambers of the rams 18, or 18a, 18b, are connected to the force-feed pressure arriving via 36 or 36'. This pressure is sufficient to keep the rams under hydraulic tension when the load of the implement is not applied to the ends of the rods 19, 19a, 19b.

This may result in a certain amount of difficulty in coupling the implement 3, especially to the top point 11.

The intermediate frame 40 or 40' aims to make this implement-coupling operation easier, but because this frame is situated in front of the tractor, the operator may not be able to see the entire mechanism, which means that the coupling difficulty remains.

The third position of the distributor 30 or the second position of the third distribution means 46 of FIG. 6 allow this drawback to be overcome.

In order to couple the implement 3 to the front of the tractor, from the driver's position, it is necessary merely to proceed as follows.

It is assumed that the implement 3 is lying on ground which is not necessarily horizontal, and that the rear bottom attachment points 10 are not at the same height; for example, the bottom attachment point 10 situated to the left, when viewed from the driver's seat of the tractor, is the lower.

On being brought into operation, the rod side chambers of the rams 18a, 18b are connected to the pipeline 36' through which liquid arrives at force-feed pressure. As the implement 3 is not attached to the hitch system, the rods 19a, 19b retract into the rams 18a, 18b and the frame 40 is made to pivot backward about an imaginary transverse geometric axis passing through the bottom attachment points 10a (FIG. 4).

The operator brings the tractor up close to the rear attachment points of the implement, having lowered the arms 5, 6 enough for the hooks 42, 43 of the frame 40 to lie below the lowermost attachment point 10 of the implement.

When the hooks 42, 43 lie under the attachment points 10 of the implement, the operator commands the raising of the arms 5, 6. Attachment will occur first of all between the hook 42 and the lower left-hand attachment point 10 of the implement, which is the lower one.

Because the arms 5, 6 are independent and because the rams 12, 13 are fed in parallel from the distributor 21, the pressure P will not rise enough (to raise the arm 5 already attached) until the ram 13, commanding the arm 6, is also subjected to a load after attachment of the hook 43.

Thus, after the hook 42 becomes hitched, this hook will remain stationary while the hook 43 will continue to rise until the bottom attachment point 10 situated to the right (viewed from the tractor) engages in the hook 43. At this instant, the two lower points 10 are engaged in the hooks 42, 43 and the frame 40 has turned about an imaginary longitudinal axis to adopt a transverse inclination similar to that of the implement. This inclination is made possible by the lengthwise freedom of the third point rams 18a, 18b.

The backward pivoting of the upper part of the frame 40 discussed earlier makes it possible to be sure that the two lower points 42, 43 stay the furthest forward, which makes them easier to couple to the bottom points 10 of the implement, without there being any interference at the top attachment point.

Locking detectors may be installed on the intermediate frame, for example in the form of indicator lights, to inform the operator that attachment of the lower points is complete.

When the lower points 42, 43 have been coupled to the implement, the top attachment point 20' will be facing, but behind, the top attachment point 11 of the implement.

In order to attach the top point 20', all the operator will need to do will be to act on the external command contact 53 to bring about the lengthening of the rams 18a, 18b, by sending the force-feed pressure into those chambers of these rams which are opposite the rod. The frame 40 therefore tilts forward about the imaginary transverse axis passing through the points 10a until the top point 11 of the implement is attached to the point 20' of the frame 40.

The external command 53 for the distributor 46 is designed in such a way that the motion of the rams 18a, 18b is halted as soon as the contact 53 is released.

A second circuit-breaking contact, operating in the same conditions as the contact 53, may be provided to command the shortening of the rams 18a, 18b so as to have complete freedom of command at the time the implement is attached.

Of course, said external commands may be duplicated in the cab so that the complete attachment operation may be performed without having to leave the driving seat.

As already indicated with regard to FIGS. 7 and 8, a U-shaped frame 40' according to the invention is advantageously equipped with two cheeks 54, 55 projecting backward for linking the top middle point of the frame to the implement, in place of a conventional stationary hook.

This special arrangement of the middle top part of the frame 40' is permitted by the link to the tractor being produced by means of the two top rams 18a, 18b arranged to form a triangle. The adjustable top bar 57 of the frame 40' can be adjusted to suit the varying geometries of implements, without affecting the geometry of the lift.

This arrangement allows the intermediate frame 40' to become universal, thus permitting the coupling of implements having beam heights defined according to the standards which differ depending on the country, for example ISO, SAE etc. standard, or depending on constraints specific to the implement.

As explained earlier, the device allows complete automatic coupling of the implement, by proceeding in the stepwise manner already described.

The centering of the intermediate frame, when connecting the lower points of the implement, guarantees an alignment which makes it possible to envisage, at the top, the automatic coupling of hydraulic and electrical functions which may be provided for the automatic-control of the implement.

The fact that the implement can be coupled without it being necessary to lift it up completely is an additional advantage as regards safety, because it eliminates the risk of a dropping which may arise during the attachment phase with a conventional intermediate frame when coupling has not been carried out correctly.

In order to carry out this automatic coupling using a frame 40' as shown in FIGS. 7 and 8, the top link bar 57 is advantageously equipped with an automatic hook 60 as illustrated in FIGS. 9 and 10 so that the coupling of the three points of the implement may be completed automatically.

Referring to FIG. 9, it is possible to see a top link bar 57' equipped with the automatic hook 60. The bar 57' preferably has an adjustable length; it is equipped at its end furthest from the hook with a ball joint 61 which can be mounted between the cheeks 54, 55 (FIGS. 7 and 8) with the aid of a spindle passing through the holes 56.

The hook 60 is articulated about a spindle 62 provided at the front end of the bar 57', arranged in the form of a fork. This fork has two branches separated by a gap in which the hook 60 is mounted so that it can rotate, the concavity of the hook pointing downward. At its rear part pointing toward the ball joint 61, this hook 60 includes a lower extension 63 below the bar 57'. A pin 64 is fixed to this extension 63 for attaching to one end of a tension spring 65, the other end of which is attached to a pin 66 borne by a sort of bracket 67 secured to the bar 57' and projecting upward above the hook 60. The pins 64 and 66 are arranged in such a way that when the hook is in the open position, as illustrated in FIG. 9, the geometric axis of the spring 65 lies ahead of the spindle 62 about which the hook 60 rotates. The return spring force exerted by the spring 65 therefore tends to keep the hook 60 open.

When the hooks are in the closed position, as illustrated in FIG. 10, the geometric axis of the spring 65 has moved behind the rotation spindle 62 which means that the action of the spring 65 tends to close the hook 60. During pivoting from the open position to the closed position or vice versa, the geometric axis of the spring 65 therefore switches from one side of the spindle 62 to the other.

A position detector 68, for example with an electric contact, may be fixed to the arm 57' [sic] in such a way that it is actuated by the lower end of the extension 63 when the hook 60 is in the locked position illustrated in FIG. 10. The locking information may be transmitted through an electric wire to the control panel of the tractor.

A safety lock 69, consisting for example of a pawl articulated to the bar 57' at a point situated behind the hook 60 may be provided. This lock 69 situated at the top of the bar 57' can be braced against an abutment region 70 on the hook 60 in the closed position, under the action of a return spring.

An unlocking handle 71 articulated to the hook is provided so as to allow an operator to lift up the lock 69 and unlock the hook 60.

At its front lower end, the bar 57' is equipped with a downwardly inclined guide piece 72.

When the hook 60 is in the open position, it projects via a cam-shaped boss 73 over the surface of the guide 72. This boss 73 has a shape which is suitable to cause the hook 60 to pivot toward its closed position when the boss 73 comes into contact with the top attachment point 11 of the implement, this generally consisting of a cylindrical spindle.

The way in which the automatic hook operates is immediately obvious from the previous explanations.

As already explained, the bar 57' retains a certain possibility for excursion about the spindle on which the ball joint 61 is mounted. When the operator, after having attached the bottom points of the frame 40', commands the forward pivoting of this frame 40', by lengthening the rams 18a, 18b, the hook 60, in the open position, is moved closer to the top attachment point 11 of the implement.

This attachment point 11, guided by the piece 72, will come into contact with the boss 73 and cause the hook 60 to close when the frame 40' has finished pivoting forward.

I claim:

1. A device for controlling an agricultural implement having at least one gage wheel and a frame adapted to be pushed by a tractor, comprising a hitch having three attachment points and lifting devices mountable on the front of a tractor including:

two arms each having one end provided with articulation means for attachment to the tractor and opposite ends each provided with means for attachment to the implement to thereby define two attachment points;

an attachment member located vertically above said two arms and defining a third attachment point between the tractor and the implement, said implement including a rear part having three attachment means for cooperating respectively with said three attachment points of the hitch, at least one lifting ram and a first fluid distribution means for controlling the raising and lowering of said two arms, a controller for controlling said distribution means in response to slippage of the tractor where the tractor is provided with slippage measuring means, said controller having a reference value so that, when the slippage exceeds the reference value, said controller will effect raising of said two arms to reduce the working depth of the implement, said attachment member including at least a third point ram connected to a second fluid distribution means, said third point ram having a piston having on one side a rod and cylinder with said piston and rod being movable relative to said cylinder, said second fluid distribution means having a first position in which said piston, rod and cylinder are freely movable and a second position in which said third point ram is locked to transfer a load from the gage wheel to the tractor, said second fluid distribution means being controlled by said controller so that, when said two arms are raised, said second fluid distribution means moves from said first to said second position to transfer at least some of the load on the gage wheel to the tractor, said third point ram being connected between the tractor and said implement so that, when said two arms are raised, said third point ram is extended, said second fluid distribution means, when in said second position, blocks flow of fluid in said third point ram which becomes compressed when said third point ram is extended whereby the raising of said two arms effects lifting of the front of the implement to effect said transfer of the load on said gage wheel to the tractor.

2. Control device according to claim 1 wherein the second distribution means (30, 30') is operated electrically and the layout is designed so that when the control device is electrically powered, the distribution means (30, 30') switch into their first position corresponding to a floating mode, whereas in the event of the electrical supply being cut off, the second distribution means switch into the second position, blocking the length of the third point ram (18; 18*a*, 18*b***).

3. The device as claimed in claim 1 wherein said one lifting ram is controlled by said first fluid distribution means.

4. The device as claimed in claims 1 or 3 wherein said third point ram has two chambers located on either side of said piston, each chamber being connected to said second fluid distribution means.

5. The device as claimed in claim 1 wherein said piston of said third point ram has a rod side chamber, said second fluid distribution means, when in said first position provides fluid to said rod side chamber at a pressure lower than 20 bar.

6. The device as claimed in claim 1 wherein said second fluid distribution means includes a third position in which the distribution of fluid is reversed relative to said first position corresponding to extending of said third point ram, actuation of said second fluid distribution means to said third position being effected by an external switch.

7. The device as claimed in claim 1 wherein said device for controlling includes an intermediate frame, said frame being U-shaped having a horizontal portion and opening downwardly in use and located between the ends of said two arms, and being connected thereto and said implement, said frame including two rams each connected at one end at spaced apart points to said horizontal portion of said frame and at the opposite ends at contiguous points on the tractor to define an angle between said rams, said angle having a vertex corresponding to said third point of attachment, said horizontal portion having a centrally located attachment for the implement.

8. The device as claimed in claim 7 wherein said two rams of said frame each include a piston having a ram side and said second distribution means includes a fluid path in said first position forming a bridge placing said ram sides of said rams in communication with one another with the sides opposite said ram sides being connected to a tank.

9. The device as claimed in claim 8 wherein a third distribution means is provided having first and second positions and connected by a fluid line in parallel to a line connecting said sides opposite said ram sides, said third distribution means, in said first position thereof, linking said sides opposite said ram sides to a low pressure reservoir and, in said second position thereof, linking said sides opposite said ram sides to a source of fluid under substantially the same pressure as the ram side of said two rams so that, extension of the rams will be effected to assist attachment of a third point of said implement after connection of said two arms to said implement.

10. The device as claimed in claim 7 wherein said intermediate frame includes along said horizontal portion two rearwardly projecting flanges each having a hole for attaching an adjustable length third point bar.

11. The device as claimed in claim 10 wherein said third point bar is provided with an automatic hook for coupling by a user located remotely from said third point bar, indicating means being provided for indicating the locking condition of said hook.

12. The device as claimed in claim 1 wherein said attachment means for said two arms allows relative motion of said two arms with respect to one another including different inclinations.

\* \* \* \* \*